No. 674,563. Patented May 21, 1901.
W. A. R. LOOSE.
APPARATUS FOR SEPARATING METALS FROM THEIR ORES.
(Application filed Feb. 1, 1901.)
(No Model.) 2 Sheets—Sheet 1.
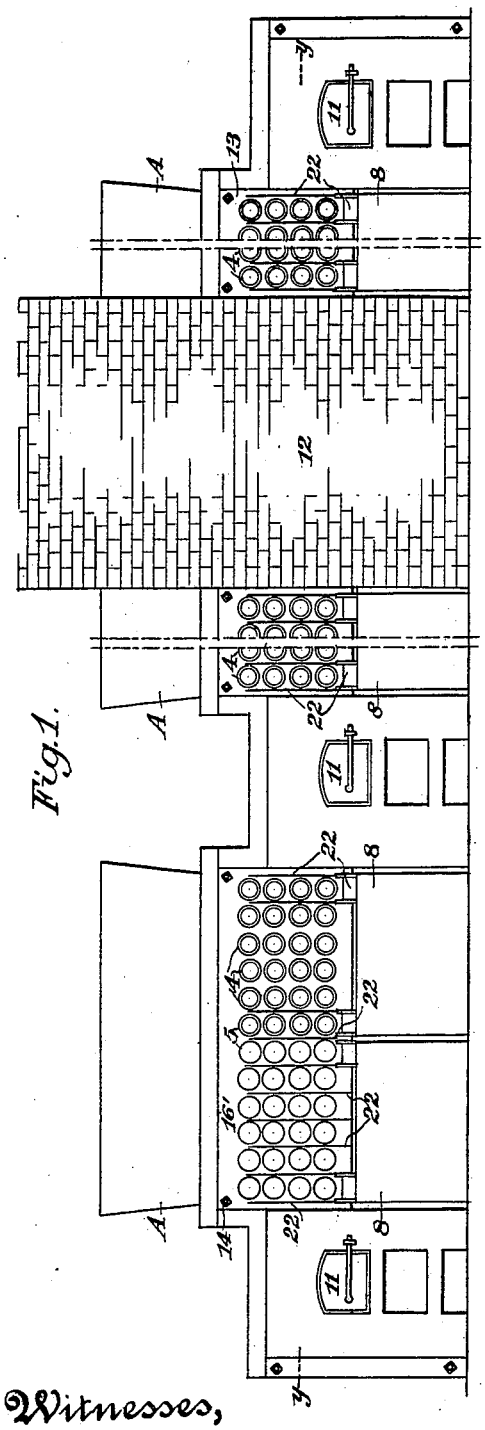
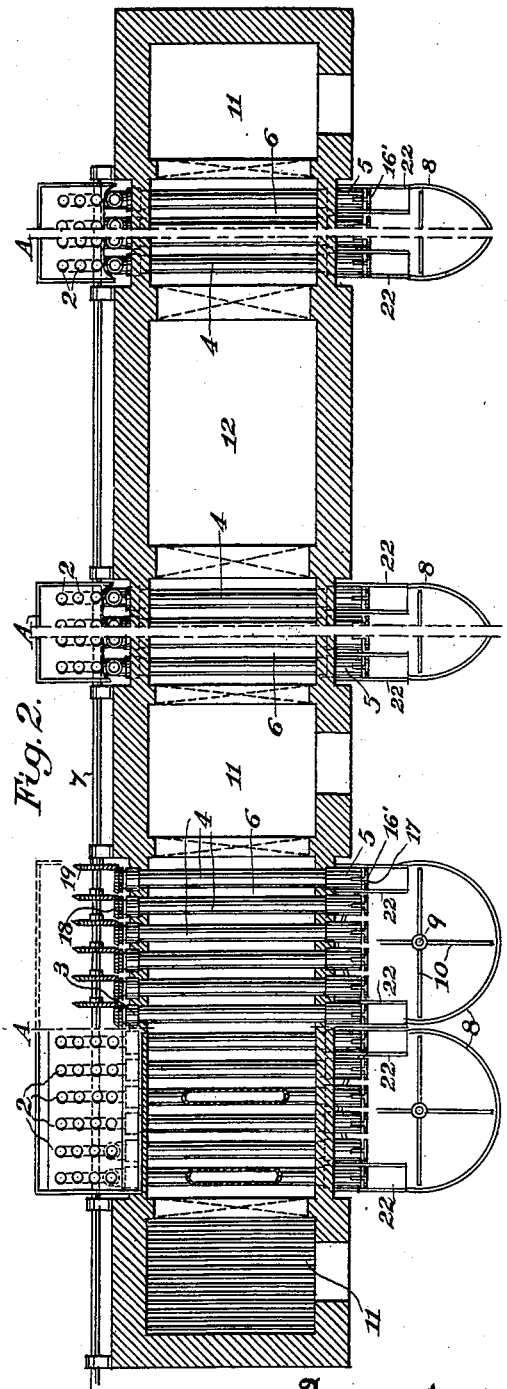

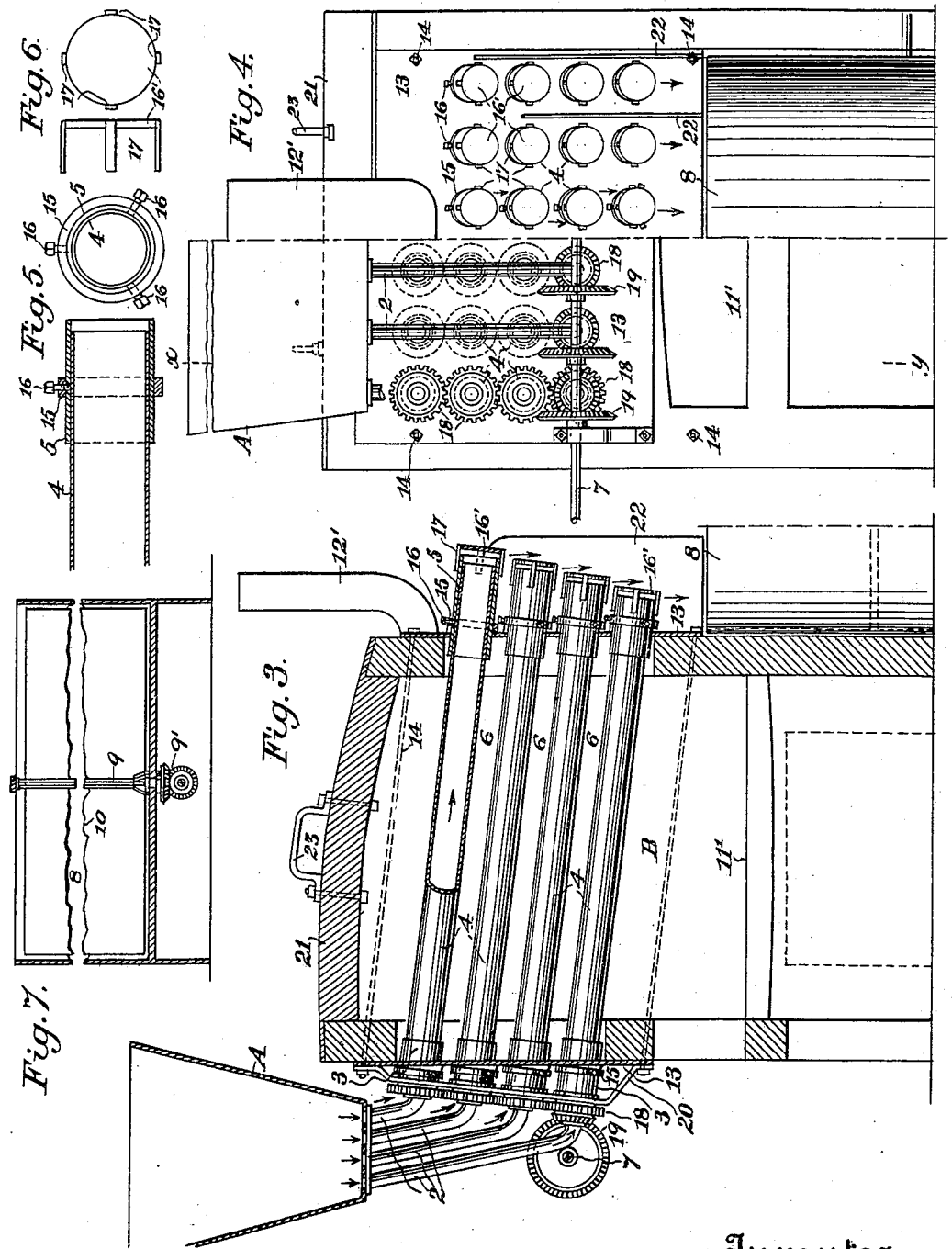

UNITED STATES PATENT OFFICE.

WARREN A. R. LOOSE, OF PROVO, UTAH.

APPARATUS FOR SEPARATING METALS FROM THEIR ORES.

SPECIFICATION forming part of Letters Patent No. 674,563, dated May 21, 1901.

Application filed February 1, 1901. Serial No. 45,678. (No model.)

*To all whom it may concern:*

Be it known that I, WARREN A. R. LOOSE, a citizen of the United States, residing at Provo, county of Utah, State of Utah, have invented an Improvement in Apparatus for Separating Metals from Their Ores; and I hereby declare the following to be a full, clear, and exact description of the same.

My invention relates to improvements in furnaces for the treatment of copper and other ores.

It consists, essentially, of a plurality of revoluble muffles through which the finely-crushed ore is made to travel and wherein it is submitted to the necessary degree of heat, means for feeding and delivering the ore to and from the muffles, and of details more fully to be hereinafter set forth.

Referring to the accompanying drawings, Figure 1 is a longitudinal elevation of my invention in a multiplied form as used with gaseous fuel. Fig. 2 is a horizontal section on the line $y\ y$ of Fig. 1. Fig. 3 is a vertical section of a single form of apparatus. Fig. 4 is a half-front and half-rear elevation. Fig. 5 is a longitudinal section through a muffle and an elevation of the same. Fig. 6 is a side and front view of a cap. Fig. 7 is a section through an agitator.

My invention is particularly designed for the reduction of the carbonates and oxids of copper to metallic copper. It is also applicable in other metallurgical operations requiring continuous treatment and where it is desired to apply the heat exterior to the containing vessel.

In the separating of copper from its ore the ore is first crushed to the desired fineness and is then mixed with from one to ten per cent. of pulverized charcoal, coke, or other suitable carbonaceous material. This mixture is delivered into the hopper A, whence it passes down through the pipes 2 and the cogged sleeves 3 into the muffles 4, which latter extend through the furnace B in horizontal rows, with the discharge ends of one row projecting beyond the ends of the muffles beneath. The incline of the pipes and the muffles is such as to allow the ore to travel therethrough by gravitation. Upon the lower end of the muffles are secured the plain sleeves 5. The ore in the muffles is subjected to a heat sufficient to reduce all the copper compounds to metallic copper. The flame in the furnace passes through the flues or spaces 6 on the outside of the muffles. By means of a driving-shaft 7 the muffles are made to revolve, the discharge of the reduced material being regulated according to the inclination of the muffles and the rapidity of their revolution. This discharge of the heated ore takes place either into the agitators or rotary crushers containing water. In the present case I have shown agitators 8, each consisting of a pan having a vertical shaft 9 with blades or arms 10 secured thereon. Suitable gearing 9' may be provided whereby the shaft and blades are rotated and the material agitated and prevented from settling in the bottom of the pan. The sudden immersion of the heated ore in the agitators causes a further disintegration of the particles and the liberation of any remaining free metallic copper. It also prevents the reoxidation of the copper, which would occur if the ore were allowed to cool slowly. From the agitators the material may be discharged and the metal collected upon concentrators or in any other desired manner.

This furnace is designed for use either with gaseous or liquid fuel or with coke, charcoal, &c. When used in the first instance, 11 represents the position of the fire-box in relation to the muffles. Where this form of fuel is used it is possible to arrange the furnaces in series, having as many auxiliary fire-boxes as desired and a central common chimney, as 12. The furnace B consists of cast-iron plates 13, held together by bolts 14 and suitably protected from the heat by brick or clay. These plates are ordinarily one-half an inch thick, six feet long, and provided with forty-eight three-inch holes, which form the bearings for the cog-sleeves 3 and the plain sleeves 5 of the muffles. These muffles are cylinders four feet in length and may be made of fire-clay, platinum, iron, or any suitable heat-resisting material. They project beyond the furnace to receive the sleeves. The sleeves covering the projecting ends of the muffles extend through the plates 13 and into the brick lining and are held in place on the muffles by means of collars 15. These collars are provided with set-screws 16, which pass through perforations in the sleeves and bind upon the muffles. The collars bear against the plates 13 and prevent the longitudinal movement of the muffles. A cap consisting of a disk 16', having prongs 17, is adapted to slip over each of the plain sleeves 5 on the discharge end of the muffles. By means of these prongs the annular discharge-space between the sleeve and disk may be varied as desired. By removing the caps the muffles may be inspected at any time. The sleeves 3 in the lower row on the feed side of the furnace are each provided with a bevel and a square cog 18, the bevel-cog engaging a bevel-gear 19 on the driving-shaft 7 and the square cog engaging a similar square cog on muffle above, whereby all the muffles are revolved in unison and by the same power. Braces or straps 20 serve to steady and support the ends of these cogged sleeves.

The furnace for coke or charcoal differs but little from the foregoing, except that the fire-box 11' is placed directly beneath the muffles. Fuel is fed in at the top of the furnace, as through a door 21. This door may be made to slide, or it may be lifted by a handle 23, as shown. 12' represents the smoke-stack. In this type of furnace there need be but twenty-four muffles. A cover or spout 22 is provided for each vertical line of muffles, which serves to conduct the reduced ore properly into the agitators.

It is understood that the size of the furnace and the number and size of the muffles may be varied according as desired.

Having thus described my invention, what I claim as new, and desire to secure by Letters Patent, is—

1. An apparatus for separating metals from their ores including a furnace, a plurality of revoluble muffles within said furnace and through which the ore is passed means for feeding one to the muffles, means adjustably connected with the lower ends of the muffles for regulating the discharge of the ore from the muffles, and a receptacle adapted to contain water into which the roasted ore is continuously discharged.

2. An apparatus for separating metals from their ores including a furnace, a plurality of inclined muffles within the furnace, means for feeding ore to said muffles, closures for the lower ends of the muffles and adjustable with relation thereto to regulate the discharge from the muffles, a receptacle adapted to contain water into which the ore is received from the muffles, and an agitator within said receptacle.

3. In an apparatus for separating metals from their ores, the combination of a furnace, a plurality of inclined muffles therein, means for supplying ores to the muffles, adjustable caps on the discharge ends of the muffles for regulating the discharge of ore, sleeves upon the upper ends of the muffles, cogs upon said sleeves, and a driving mechanism for the cogs whereby the sleeves and muffles are revolved.

4. In an apparatus for roasting ores, the combination of a furnace, an ore-supply, feed-pipes connecting with the supply, inclined cylinders within the furnace, and sleeved connections between one end of the cylinders and the feed-pipes, means for revolving the cylinders, and an adjustable closure upon the lower end of each of the cylinders for regulating the discharge of ore therefrom.

5. In an apparatus for roasting ores, the combination of a furnace, inclined muffles within the furnace, means for feeding ore to said muffles, means for rotating the muffles, and closures upon the lower end of each muffle and movable lengthwise thereon to regulate the discharge of ore from the muffles.

6. In an apparatus for roasting ores, the combination of a furnace, a plurality of revoluble inclined muffles within the furnace, feed-pipes connecting with these muffles, and a cap adjustable upon the lower end of each muffle whereby the discharge-outlet may be regulated.

7. The combination in an apparatus for roasting ores of a furnace-chamber, a plurality of inclined revoluble muffles within the furnace and through which the ore passes, means whereby crushed ore is delivered into these muffles, a removable cap upon the lower end of each muffle and adjustable to regulate the discharge of ore, a grate situated below the muffles and means whereby the fuel is delivered into the furnace.

8. The combination in an apparatus for roasting ores of a furnace, a plurality of inclined muffles within said furnace, sleeves upon the ends of these muffles, the sleeves upon one end provided with cogs engaging each other whereby the muffles may be revolved in unison, adjustable caps fitting the sleeves upon the other end of the muffles, feed-pipes connecting with the muffles, and means for applying heat exterior to the muffles.

9. The combination in an apparatus for roasting ores of a furnace, one or more revoluble muffles within the furnace, means by which the ore is fed into and passed through the muffles, sleeves upon the ends of these muffles, collars upon the sleeves whereby these sleeves are held in position, and by which longitudinal movement of the muffles is prevented, and adjustable caps upon the ends of the lower sleeves by which the discharge-outlet of the muffles may be regulated.

10. An apparatus for separating metals from their ores consisting in the combination of a furnace, a plurality of inclined muffles within said furnace, sleeves upon the ends of the muffles exterior to the furnace, cogs upon the sleeves upon one of these ends, a shaft having gears engaging these cogs whereby the muffles are revolved in unison, feed-pipes connecting with each of these muffles, adjustable caps upon the sleeves upon the other end of the muffles, spouts leading from the discharge end of the muffles and receptacles containing water into which the ore is discharged from the spouts.

11. In an apparatus for separating metals from their ores, the combination of a furnace, a plurality of inclined revoluble muffles within said furnace, and means for delivering ore thereto, the muffles in each horizontal row having their discharge ends projecting beyond the ends of those muffles beneath, and adjustable caps upon said discharge ends for regulating the discharge of ore.

In witness whereof I have hereunto set my hand.

W. A. R. LOOSE.

Witnesses:
  JAS. A. TWELVES,
  JOS. A. BUTTLE.